United States Patent [19]

Valyocsik

[11] Patent Number: 4,568,654
[45] Date of Patent: Feb. 4, 1986

[54] ZEOLITE ZSM-51 COMPOSITION

[75] Inventor: Ernest W. Valyocsik, Yardley, Pa.

[73] Assignee: Mobil Oil Corporation, New York, N.Y.

[21] Appl. No.: 640,211

[22] Filed: Aug. 13, 1984

Related U.S. Application Data

[63] Continuation of Ser. No. 479,522, Mar. 28, 1983, abandoned, which is a continuation-in-part of Ser. No. 438,817, Nov. 3, 1982, abandoned.

[51] Int. Cl.$^4$ ............... C01B 33/28; B01J 29/06
[52] U.S. Cl. ................... 502/62; 423/328; 423/332; 502/77; 502/150; 502/162
[58] Field of Search ............... 423/326–333, 423/335, 277; 502/60, 62, 77, 150, 162, 164

[56] References Cited

U.S. PATENT DOCUMENTS

| | | | |
|---|---|---|---|
| 3,832,449 | 8/1974 | Rosinski et al. | 423/328 |
| 4,000,248 | 12/1976 | Martin | 423/329 |
| 4,086,186 | 4/1978 | Rubin et al. | 423/329 X |
| 4,088,739 | 5/1978 | Vaughan et al. | 423/329 |
| 4,251,499 | 2/1981 | Nanne et al. | 423/329 |
| 4,259,306 | 3/1981 | Pelrine | 423/328 X |
| 4,310,440 | 1/1982 | Wilson et al. | 252/435 |
| 4,366,135 | 12/1980 | Le Van Mao et al. | 423/329 |
| 4,388,285 | 6/1983 | Rankel et al. | 423/329 |
| 4,391,785 | 8/1983 | Rosinski et al. | 423/329 |
| 4,397,825 | 8/1983 | Whittam | 423/328 X |
| 4,414,189 | 11/1983 | Kokotailo et al. | 423/328 |
| 4,423,021 | 12/1983 | Rollmann et al. | 423/333 |
| 4,481,174 | 11/1984 | Baacke et al. | 423/306 |
| 4,481,177 | 11/1984 | Valyocsik | 423/329 |
| 4,528,171 | 7/1985 | Casci et al. | 423/328 X |

FOREIGN PATENT DOCUMENTS

| | | |
|---|---|---|
| 0042226 | 12/1981 | European Pat. Off. |
| 0059059 | 9/1982 | European Pat. Off. |
| 0063436 | 10/1982 | European Pat. Off. |
| 0077624 | 4/1983 | European Pat. Off. |
| 2077709 | 12/1981 | United Kingdom . |

*Primary Examiner*—Edward J. Meros
*Attorney, Agent, or Firm*—Alexander J. McKillop; Michael G. Gilman; Marina V. Schneller

[57] ABSTRACT

A novel crystalline zeolite identified as zeolite ZSM-51 and its method of preparation is disclosed. The use of the material as a catalyst is also disclosed.

1 Claim, No Drawings

ZEOLITE ZSM-51 COMPOSITION

This is a continuation application of application Ser. No. 479,522, filed on Mar. 28, 1983, now abandoned, which is a continuation-in-part application of application Ser. No. 438,817 filed on Nov. 3, 1982, now abandoned.

BACKGROUND OF THE INVENTION

1. Field of the Invention

This invention relates to a novel porous crystalline material, hereinafter referred to as zeolite ZSM-51, to a method for its preparation and to its use in catalytic conversion of organic compounds and combustion of carbon monoxide.

2. Description of the Prior Art

Zeolitic materials, both natural and synthetic, have been demonstrated in the past to have catalytic properties for various types of hydrocarbon conversion. Certain zeolitic materials are ordered, porous crystlline aluminosilicates having a definite crystalline structure as determined by x-ray diffraction, within which there are a large number of smaller cavities which may be interconnected by a number of still smaller channels or pores. These cavities and pores are uniform in size within a specific zeolitic material. Since the dimensions of these pores are such so as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. The aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), zeolites ZSM-21 and ZSM-38 (U.S. Pat. No. 4,046,859), and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio of unbounded. ZSM-5 is one such example wherein the $SiO_2/Al_2O_3$ ratio is at least 5, up to infinity. U.S. Pat. No. 3,941,871 now U.S. Pat. No. Re. 29,948, discloses a porous crystalline silicate made from a reaction mixture containing no deliberately added alumina in the recipe and exhibiting the x-ray diffraction pattern characteristic of ZSM-5 type zeolites. U.S. Pat. Nos. 4,061,724, 4,073,865 and 4,104,294 describe crystalline silicates or organosilicates of varying alumina and metal content.

SUMMARY OF THE INVENTION

The present invention is directed towards a novel porous crystalline material which has been designated as zeolite ZSM-51, a method for its preparation and catalytic conversion utilizing the same as a catalyst.

ZSM-51 is a novel crystalline zeolitic material prepared from a reaction mixture containing certain organic complexes. While not wishing to be bound by any theory of operation, nevertheless, it appears that certain organic complexes function as templates for the synthesis of said zeolite ZSM-51. What is meant by the above is that said organic complexes are absolutely necessary for the crystallization of ZSM-51. It hs often been desirable in the prior art to include complexes in the conventional forming solution for the preparation of various zeolites, particularly zeolites of the ZSM-5 type. In this connection, typical prior art patents such as U.S. Pat. Nos. 4,100,262; 3,941,871; 3,709,979; 3,702,886 and 3,373,102 generally teach the incorporation of metallic complexes into zeolites including ZSM-5. However, in all the above-mentioned procedures, the complex was not used as a template but was merely at most added to the conventional crystallization mix which contained a quaternary ammonium cation or precursor thereof. In other words, in the prior art techniques for the formation of zeolites wherein metals were introduced into the forming solution, the forming solution itself would have produced the same zeolite irrespective of the presence or absence of the metal complex. Thus, it is clear that the complex was not acting as a template for the formation of the zeolite; but the organic cation was, in fact, a template. As has heretofore been indicated in the preparation of ZSM-51 of this invention, the specific organic complexes appear to function as templates.

The organic complexes which are useful in carrying out this invention include the following:

1. Cobalticinium cation

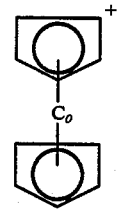

The cobalticinium cation hereafter referred to as $[Co(C_5H_5)_2]+$ is conveniently supplied by cobalticinium hexafluorophosphate.

2. Dimethylpiperidinium

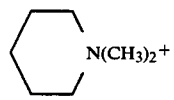

The dimethylpiperidinium ion is conveniently supplied by utilizing a dimethylpiperidinium halide such as dimethylpiperidinium iodide.

3. Trimethylene bis trimethylammonium

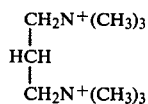

The trimethylene bis trimethylammonium ion is conveniently supplied by utilizing trimethylene bis trimethylammonium iodide—hereinafter referred to as diquat-3.

4. Tetramethyl piperazinium

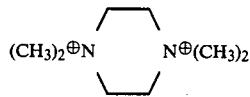

The tetramethyl piperazinium ion is conveniently supplied by utilizing tetramethyl piperazinium iodide.

In the as synthesized form, ZSM-51 has a calculated composition in terms of moles of oxides after dehydration per 100 moles of silica as follows:

$(X)R_2O.(Y)M_2O.0-7Al_2O_3.100SiO_2$ wherein R represents one of the organic complexes previously defined, M is an alkali metal cation, i.e. sodium or potassium, X is a number ranging from 0.01 to 5 and Y is a number ranging from 0.1 to 10.

As can be seen from the above, ZSM-51 includes zeolitic compositions having aluminum in the crystal framework, as well as compositions which are essentially free of alumina. Thus, a convenient way of expressing the above is to state that ZSM-51 has a silica-to-alumina ratio of from about 15 to infinity. It is to be understood that ZSM-51 may also have iron, boron, and/or chromium in positions of tetrahedral substitution within the silica lattice. To the extent that boron and/or aluminum and/or iron and/or chromium is present in the crystal lattice, it possesses a negative charge, one excess electron for each such heteroatom, which is balanced by cation. These cations may be replaced at least in part by other ions utilizing conventional ion exchange techniques and it may be necessary to precalcine the crystals prior to ion exchange. Ions introduced to replace the original alkali and/or organic cations may be any that are desired so long as they can pass through the channels within the subject crystals. Desired replacing cations are those of the hydrogen, ammonia, metals of Group I-VIII of the Periodic Table.

ZSM-51 possesses a distinctive x-ray diffraction pattern containing the following significant lines.

TABLE 1

| Most significant lines | |
|---|---|
| Interplanar d-spacing (A) | Relative Intensity |
| 11.12 + 0.17 | W-M |
| 9.21 + 0.14 | W-VS |
| 6.85 + 0.10 | W |
| 5.84 + 0.09 | W |
| 4.61 + 0.07 | S-VS |
| 4.47 + 0.07 | W-M |
| 4.31 + 0.06 | VS |
| 3.98 + 0.06 | M-S |
| 3.77 + 0.06 | W |
| 3.70 + 0.06 | W-M |
| 3.57 + 0.05 | W-M |
| 3.34 + 0.05 | W-M |
| 3.27 + 0.05 | M-S |
| 3.23 + 0.05 | W |
| 2.69 + 0.04 | W |
| 2.51 + 0.04 | W |
| 2.31 + 0.03 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in A, corresponding to the recorded lines, were determined. In Table 1, the relative intensities are given in terms of the symbols vs=very strong, s=strong, m=medium, w=weak, etc. It should be understood that this x-ray diffraction pattern is characteristic of all the species of ZSM-51 zeolite compositions. The sodium form as well as other cationic forms reveal substantially the same pattern with some minor shifts in interplanar spacing and variation in relative intensity. Other minor variations can occur, depending on the silicon to boron ratio of the particular sample, as well as its degree of thermal treatment.

ZSM-51 is prepared from a reaction mixture containing a source of silica, the organic template R, an alkali metal oxide, e.g. sodium, water, and optionally alumina, and having a composition, in terms of mole ratios of oxides, falling with the following ratios:

| REACTANTS | BROAD | PREFERRED |
|---|---|---|
| $SiO_2/Al_2O_3$ | 10-∞ | 15-25,000 |
| $OH^-/SiO_2$ | 0.005-1.0 | 0.2-0.6 |
| $M^+/SiO_2$ | 0.001-5.0 | 0.1-1.5 |
| $H_2O/SiO_2$ | 10-200 | 20-100 |
| $R/SiO_2$ | 0.01-3 | 0.05-1.5 | wherein R is at least one organic cation previously defined and M is alkali metal.

It has been found that when R is a cobalticinium ion, ZSM-51 is not produced from reaction mixtures which are essentially aluminum-free. However, when R is dimethyl piperidinium, ZSM-51 can be crystallized from reaction mixtures which are essentially aluminum-free.

DESCRIPTION OF PREFERRED EMBODIMENTS

Crystallization can be carried out at either static or stirred condition in polypropylene jars or in teflon lined or stainless steel autoclaves. The total useful range of temperatures is 80° C. to about 180° C. for about 2 to 10 days. Thereafter, the crystals are separated from the liquid and recovered. The composition can be prepared utilizing materials which supply the appropriate oxide. Such compositions include sodium silicate, silica hydrosol, silica gel, silicic acid, sodium hydroxide, and the organic compound. It should be realized that the oxide can be supplied from more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

ZSM-51, especially in its metal, hydrogen, ammonium, alkylammonium and arylammonium forms, can be beneficially converted to another form for use as a catalyst or an adsorbant by thermal treatment. This thermal treatment is generally performed by heating one of these forms in an atmosphere such as air, nitrogen, hydrogen, steam, etc., at a temperature of at least 700° F. for at least one minute and generally not more than 20 hours to remove part or all of the water and the organic constituent. While subatmospheric pressure can be employed for the thermal treatment, atmospheric pressure is desired for reasons of convenience. The thermal treatment can be performed at a temperature up to about 1700° F. The thermally treated product is particularly useful in the catalysis of certain hydrocarbon conversion reactions as well as for the oxidation of carbon monoxide. Since ZSM-51 does not absorb $C_6$-hydrocarbons, its use in hydrocarbon conversion is limited to smaller molecules. It can be used to catalytically crack, isomerize and otherwise convert $C_2$-$C_5$ olefins, paraffins, etc. The ability to oxidize carbon monoxide makes ZSM-51 useful in automobile exhaust systems.

ZSM-51 can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is desired. Such component can be exchanged into the composition, impregnated therein or physically intimately admixed therewith. Such component can be impregnated in or onto it such as, for example, by, in the case of platinum, treating the subject crystalline material with a solution containing a platinum metal-containing ion. Thus, suitable platinum compounds include chloro-platinic acid, platinous chloride and various compounds containing the platinum tetraamine-platinum complex.

Simple dehydration of the crystal can also be performed at lower temperatures, such as room temperature, merely by placing the ZSM-51 zeolite type crystal in a vacuum, but a longer time is required to obtain a sufficient amount of dehydration.

In the case of many catalysts, it is desired to incorporate the new crystal with another material resistant to the temperatures and other conditions employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new boron-containing crystal, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, ZSM-51 crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia. The relative proportions of finely divided crystalline material and inorganic oxide gel matrix vary widely, with the crystal content ranging from about 1 to about 90 percent by weight.

The catalyst can also be used for hydroisomerization of normal paraffins, when provided with a hydrogenation component, e.g. platinum. Hydroisomerization is carried out at a temperature between 200° F. and 700° F., preferably 300° F. to 550° F., with a liquid hourly space velocity between 0.01 and 2, preferably between 0.25 and 0.50, employing hydrogen such that the hydrogen to hydrocarbon mole ratio is between 1:1 and 5:1. Additionally, the catalyst can be used for olefin isomerization, employing temperatures between 30° F. and 700° F.

Other reactions which can be accomplished employing the catalyst of this invention, include olefin polymerization (oligomerization) and other organic compound conversion such as the conversion of alcohols (e.g. methanol) to hydrocarbon.

In order to more fully illustrate the nature of the invention and the manner of practicing same, the following examples are presented.

EXAMPLES 1-3

These examples will illustrate that ZSM-51 cannot be prepared utilizing a cobalticinium ion when the reaction mixture is essentially free of alumina. In each of Examples 1-3, crystallization was attempted utilizing a reaction mixture containing cobalticinium hexafluorophosphate, water, Q-brand sodium silicate (27.8% $SiO_2$; 8.4% $Na_2O$; 63.8% $H_2O$). The attempted crystallizations were carried out at 160° C. while stirring at autogenous pressure. In each of Examples 1-3, $H_2O/SiO_2$ molar ratio was 40, and the $Na^+/SiO_2$ molar ratio was 0.6. Additional reaction compositions and the results obtained are shown in the following Table 2:

TABLE 2

Crystallizations with Complexes
Mixture Mole Ratios

| Ex. | $\frac{SiO_2}{Al_2O_3}$ | $\frac{OH^-}{SiO_2}$ | $\frac{R}{SiO_2}$ | Days | Product |
|---|---|---|---|---|---|
| 1 | ∞ | 0.40 | 0.10 | 4 | Amorphous, mainly α - cristobalite |
| 2 | ∞ | 0.40 | 0.1 | 4 | Amorphous, mainly α - cristobalite |
| 3 | ∞ | 0.40 | 0.02 | 3 | Amorphous, mainly α - cristobalite |

As can be seen from the above table, none of Examples 1-3 resulted in a successful preparation of ZSM-51 due to the fact that there was no deliberate addition of alumina and that a cobalticinium ion was employed as a template.

EXAMPLES 4-8

The procedure of Examples 1-3 was repeated with the exception that $Al_2(SO_4)_3.16H_2O$ was added to the reaction mixture. Additional reaction compositions and the results obtained are shown in the following Table 3:

TABLE 3

Crystallizations with Complexes
Mixture Mole Ratios

| Ex. | $\frac{SiO_2}{Al_2O_3}$ | $\frac{OH^-}{SiO_2}$ | $\frac{R}{SiO_2}$ | Days | Product |
|---|---|---|---|---|---|
| 4 | 360 | 0.40 | 0.10 | 4 | 100% ZSM-51 |
| 5 | 90 | 0.40 | 0.10 | 3 | 100% ZSM-51 |
| 6 | 90 | 0.40 | 0.02 | 3 | 10% ZSM-51 |
| 7 | 90 | 0.40 | 0.10 | 3 | part. crystalline ZSM-51 |
| 8 | 60 | 0.40 | 0.10 | 4 | 100% ZSM-51 |

EXAMPLE 9

The procedure of Examples 4-8 was repeated with the exception that silica sol and sodium aluminate was substituted for the Q-brand sodium silicate and the aluminum sulfate.

The reaction mixture had a silica-to-alumina ratio of 60, a water to silica ratio of 40, an $OH^-$ to silica ratio of 0.4, an $Na^+/SiO_2$ ratio of 0.4 and an $R/SiO_2$ ratio of 1.0. Crystallization was carried out for five days after which a product was obtained which was 100% ZSM-51.

EXAMPLE 10

This example will demonstrate the use of potassium in the forming solution. In this example, crystallization was again carried out at 160° C. while stirring at autogenous pressure but the reaction mixture contained potassium silicate manufactured by the Philadelphia Quartz Company under their tradename "KASIL-88", $Al_2(SO_4)_3.16H_2O$, water, and the cobalticinium hexafluorophosphate.

The mole ratio of the reaction mixture was as follows:

| | |
|---|---|
| silica-to-alumina | 60 |
| water to silica | 40 |
| $OH^-/SiO_2$ | 0.4 |
| $K^+/SiO_2$ | 0.6 |
| $R/SiO_2$ | 0.10 |

Crystallization was carried out for three days after which the product obtained was 100% ZSM-51.

EXAMPLES 11-12

The procedure of Examples 4-8 was repeated with the exception that the concentration of the various components of the reaction mixture was varied. In each of Examples 11 and 12 the water to silica ratio was 40. Additional reaction compositions and the results obtained are shown in the following Table 4:

TABLE 4

Crystallizations with Complexes
Mixture Mole Ratios

| Ex. | $\frac{SiO_2}{Al_2O_3}$ | $\frac{OH^-}{SiO_2}$ | $\frac{R}{SiO_2}$ | $\frac{Na^+}{SiO_2}$ | Days | Products |
|---|---|---|---|---|---|---|
| 11 | 30 | 0.40 | 0.10 | 0.6 | 2 | 100% ZSM-51 |
| 12 | 15 | 0.40 | 0.10 | 0.93 | 2 | ZSM-51 + unident. component |

EXAMPLES 13-14

The procedure of Example 9 was repeated with the exception that the molar ratio of reactants was varied. In both of these examples, the water to silica molar ratio was 40. Additional reaction composition and results obtained are shown in the following Table 5:

TABLE 5

Crystallizations with Complexes
Mixture Mole Ratios

| Ex. | $\frac{SiO_2}{Al_2O_3}$ | $\frac{OH^-}{SiO_2}$ | $\frac{R}{SiO_2}$ | $\frac{Na^+}{SiO_2}$ | Days | Product |
|---|---|---|---|---|---|---|
| 13 | 15 | 0.05 | 0.09 | 0.18 | 6 | About 2% crystalline |
| 14 | 10 | 0.7 | 0.09 | 0.27 | 6 | About 5% crystalline |

The product of Example 8 had the following x-ray diffraction pattern when dried at room temperature.

| | ZSM-51 (Example 8) As Synthesized | |
|---|---|---|
| $2\theta$ | d-spacing | Intensity |
| 7.98 | 11.08 | 7 |
| 9.20 | 9.61 | 2 |
| 9.60 | 9.21 | 18 |
| 11.72 | 7.55 | 5 |
| 12.93 | 6.85 | 2 |
| 14.20 | 6.24 | 1 |
| 14.82 | 5.98 | 2 |
| 15.20 | 5.83 | 3 |
| 17.32 | 5.12 | 2 |
| 17.94 | 4.94 | 1 |
| 18.60 | 4.77 | 2 |
| 19.22 | 4.62 | 69 |
| 19.86 | 4.47 | 24 |
| 20.60 | 4.31 | 100 |
| 22.32 | 3.98 | 39 |

| ZSM-51 (Example 8) As Synthesized | | |
|---|---|---|
| 2θ | d-spacing | Intensity |
| 23.60 | 3.77 | 13 |
| 24.02 | 3.70 | 17 |
| 24.59 | 3.62 | 2 |
| 24.90 | 3.58 | 20 |
| 26.00 | 3.43 | 6 |
| 26.65 | 3.34 | 18 |
| 27.22 | 3.28 | 28 |
| 27.56 | 3.24 | 13 |
| 28.60 | 3.12 | 4 |
| 28.99 | 3.08 | 4 |
| 29.48 | 3.03 | 2 |
| 29.73 | 3.00 | 3 |
| 29.90 | 2.99 | 1 |
| 31.44 | 2.85 | 2 |
| 32.24 | 2.78 | 2 |
| 32.66 | 2.74 | 2 |
| 33.28 | 2.69 | 9 |
| 34.82 | 2.58 | 2 |
| 35.35 | 2.54 | 3 |
| 35.63 | 2.52 | 10 |
| 36.55 | 2.458 | 5 |
| 36.90 | 2.436 | 3 |
| 37.53 | 2.396 | 3 |
| 39.00 | 2.309 | 5 |
| 39.30 | 2.292 | 2 |
| 41.20 | 2.191 | 2 |
| 41.95 | 2.154 | 1 |
| 42.75 | 2.115 | 2 |
| 45.45 | 1.996 | 2 |
| 46.65 | 1.947 | 5 |
| 47.65 | 1.908 | 6 |

The product of Example 8 had the following x-ray diffraction pattern when calcined for four hours at 500° C.

| ZSM-51 (Example 8) Calcined Four Hours at 500° C. | | |
|---|---|---|
| 2θ | d-spacing | Intensity |
| 7.95 | 11.12 | 7 |
| 9.56 | 9.25 | 20 |
| 11.78 | 7.51 | 5 |
| 12.92 | 6.85 | 1 |
| 14.20 | 6.24 | 1 |
| 14.82 | 5.98 | 1 |
| 15.20 | 5.83 | 1 |
| 17.35 | 5.11 | 1 |
| 18.60 | 4.77 | 2 |
| 19.28 | 4.60 | 70 |
| 19.85 | 4.47 | 26 |
| 20.57 | 4.32 | 100 |
| 22.37 | 3.97 | 37 |
| 22.89 | 3.89 | 3 |
| 23.60 | 3.77 | 17 |
| 23.98 | 3.71 | 16 |
| 24.59 | 3.62 | 2 |
| 24.98 | 3.56 | 22 |
| 26.00 | 3.43 | 8 |
| 26.68 | 3.34 | 17 |
| 27.21 | 3.28 | 29 |
| 27.57 | 3.24 | 14 |
| 28.60 | 3.12 | 4 |
| 29.04 | 3.07 | 5 |
| 29.42 | 3.04 | 2 |
| 29.72 | 3.01 | 3 |
| 29.84 | 2.99 | 1 |
| 31.50 | 2.84 | 2 |
| 32.19 | 2.78 | 1 |
| 32.62 | 2.75 | 3 |
| 33.29 | 2.69 | 10 |
| 33.92 | 2.64 | 2 |
| 34.85 | 2.57 | 2 |
| 35.40 | 2.54 | 4 |
| 35.74 | 2.51 | 11 |
| 36.63 | 2.453 | 6 |
| 36.83 | 2.440 | 6 |
| 37.60 | 2.392 | 5 |
| 38.50 | 2.338 | 2 |
| 39.03 | 2.308 | 8 |
| 39.40 | 2.287 | 3 |
| 39.80 | 2.265 | 1 |
| 41.25 | 2.188 | 2 |
| 41.95 | 2.154 | 2 |
| 42.38 | 2.133 | 1 |
| 42.73 | 2.116 | 3 |
| 45.42 | 1.997 | 3 |
| 46.75 | 1.943 | 7 |
| 47.40 | 1.918 | 1 |
| 47.80 | 1.903 | 4 |

The product of Example 11 had the following x-ray diffraction pattern when dried at room temperature.

| ZSM-51 (Example 11) As Synthesized | | |
|---|---|---|
| 2θ | d-spacing | Intensity |
| 7.93 | 11.15 | 5 |
| 9.55 | 9.26 | 7 |
| 11.70 | 7.56 | 3 |
| 12.89 | 6.87 | 2 |
| 14.20 | 6.24 | 1 |
| 15.15 | 5.85 | 2 |
| 17.35 | 5.11 | 2 |
| 17.88 | 4.96 | 1 |
| 18.60 | 4.77 | 3 |
| 19.20 | 4.62 | 50 |
| 19.81 | 4.48 | 22 |
| 20.58 | 4.32 | 100 |
| 22.30 | 3.99 | 27 |
| 22.81 | 3.90 | 3 |
| 23.59 | 3.77 | 12 |
| 23.97 | 3.71 | 18 |
| 24.90 | 3.58 | 13 |
| 25.99 | 3.43 | 6 |
| 26.63 | 3.35 | 12 |
| 27.19 | 3.28 | 22 |
| 27.50 | 3.24 | 12 |
| 28.60 | 3.12 | 4 |
| 28.98 | 3.08 | 4 |
| 29.44 | 3.03 | 2 |
| 29.75 | 3.00 | 2 |
| 29.84 | 2.99 | 1 |
| 31.53 | 2.84 | 2 |
| 32.09 | 2.79 | 3 |
| 32.50 | 2.75 | 4 |
| 33.20 | 2.70 | 9 |
| 34.85 | 2.57 | 2 |
| 35.35 | 2.54 | 3 |
| 35.65 | 2.52 | 8 |
| 36.65 | 2.452 | 5 |
| 36.80 | 2.442 | 4 |
| 37.50 | 2.398 | 2 |
| 39.00 | 2.309 | 6 |
| 39.30 | 2.292 | 2 |
| 39.70 | 2.270 | 3 |
| 41.20 | 2.191 | 1 |
| 41.95 | 2.154 | 2 |
| 42.70 | 2.117 | 4 |
| 45.40 | 1.998 | 3 |
| 46.63 | 1.948 | 6 |
| 47.72 | 1.906 | 3 |

EXAMPLES 15-20

Examples 15-20 will illustrate the use of dimethylpiperidinium ion in the reaction mixture for the preparation of ZSM-51.

A reaction mixture was prepared containing water, dimethylpiperidinium iodide, silica, and alkali metal and in some examples added alumina. In Examples 15 and 16 no alumina was added. In Examples 17–20 deliberate additions of alumina were made utilizing $Al_2(SO_4)_3 \cdot 16H_2O$. In Examples 15, 16 and 20 sodium hydroxide was added whereas in Examples 17, 18 and 19 potassium hydroxide was added. Crystallization was carried out at 160° C. while stirring at autogenous pressures. The mole ratio of the reaction mixture and the crystallization time, as well as the results obtained are shown in the following Table 6.

TABLE 6
Crystallizations with Dimethylpiperidinium

| | Mixture Mole Ratio | | | | | | | |
|---|---|---|---|---|---|---|---|---|
| Ex. | $SiO_2/Al_2O_3$ | $H_2O/SiO_2$ | $OH^-/SiO_2$ | $Na^+/SiO_2$ | $K^+/SiO_2$ | $R/SiO_2$ | Time, Days | Product |
| 15 | ∞ | 40 | 0.1 | 0.1 | — | 0.10 | 3 | 100% ZSM-51 |
| 16 | ∞ | 40 | 0.2 | 0.2 | — | 0.10 | 3 | 100% ZSM-51 |
| 17 | 90 | 40 | 0.3 | — | 0.39 | 0.10 | 3 | 100% ZSM-51 |
| 18 | 60 | 40 | 0.2 | — | 0.33 | 0.10 | 3 | 100% ZSM-51 |
| 19 | 60 | 40 | 0.2 | — | 0.33 | 0.10 | 4 | 100% ZSM-51 |
| 20 | 60 | 40 | 0.2 | 0.33 | — | 0.10 | 3 | 100% ZSM-51 |

R = Dimethylpiperidinium Iodide

From the above, it can be seen that utilizing dimethylpiperidinium iodide as a template for the crystallization of ZSM-51, it was possible to utilize reaction mixtures which did not contain any added alumina, i.e. see Examples 15 and 16, as well as reaction mixtures which did contain alumina, i.e. see Examples 17–20.

The product of Example 19 had the following x-ray diffraction pattern when dried at room temperature.

| ZSM-51 (Example 19) As Synthesized | | |
|---|---|---|
| $2\theta$ | d-Spacing | Intensity |
| 7.99 | 11.06 | 24 |
| 9.61 | 9.20 | 48 |
| 11.71 | 7.56 | 2 |
| 12.96 | 6.83 | 6 |
| 14.22 | 6.23 | 5 |
| 14.79 | 5.99 | 10 |
| 15.29 | 5.79 | 7 |
| 15.92 | 5.57 | 1 |
| 17.46 | 5.08 | 1 |
| 18.49 | 4.80 | 2 |
| 19.22 | 4.62 | 71 |
| 19.84 | 4.47 | 28 |
| 20.64 | 4.30 | 100 |
| 22.34 | 3.98 | 39 |
| 23.59 | 3.77 | 12 |
| 24.01 | 3.71 | 19 |
| 24.92 | 3.57 | 18 |
| 26.07 | 3.42 | 6 |
| 26.73 | 3.34 | 24 |
| 27.32 | 3.26 | 37 |
| 27.59 | 3.23 | 12 |
| 28.67 | 3.11 | 7 |
| 29.07 | 3.07 | 4 |
| 29.49 | 3.03 | 4 |
| 29.79 | 3.00 | 8 |
| 30.64 | 2.92 | 1 |
| 31.52 | 2.84 | 3 |
| 32.22 | 2.78 | 2 |
| 32.72 | 2.74 | 3 |
| 33.31 | 2.69 | 10 |
| 34.22 | 2.62 | 1 |
| 34.92 | 2.57 | 2 |
| 35.44 | 2.53 | 2 |
| 35.77 | 2.51 | 11 |
| 36.56 | 2.458 | 5 |
| 36.86 | 2.438 | 4 |
| 37.64 | 2.390 | 3 |
| 39.07 | 2.305 | 5 |
| 39.42 | 2.286 | 3 |
| 40.39 | 2.233 | 1 |
| 41.32 | 2.185 | 2 |
| 42.09 | 2.147 | 1 |
| 42.82 | 2.112 | 2 |
| 45.59 | 1.990 | 1 |
| 46.49 | 1.953 | 1 |
| 46.79 | 1.941 | 4 |
| 47.49 | 1.914 | 1 |
| 47.82 | 1.902 | 1 |
| 48.89 | 1.863 | 1 |
| 49.64 | 1.836 | 2 |

EXAMPLES 21–22

The procedure of Examples 15–20 was repeated with the exception that trimethylene bis trimethylammonium ion was used as a template. This ion was conveniently supplied by utilizing in the reaction mixture trimethylene bis trimethylammonium iodide. In addition to the iodide, the reaction mixture contained a silica sol, water, $Al_2(SO_4)_3 \cdot 16H_2O$ and sodium hydroxide, for Example 21, and potassium hydroxide for Example 22. Crystallization was carried out at 160° C. in a stirred autoclave. The results obtained as well as the molar ratio of reaction mixtures is shown in the following Table 7.

TABLE 7
Crystallizations with Trimethylene bis trimethylammonium

| | Mixture Mole Ratio | | | | | | | |
|---|---|---|---|---|---|---|---|---|
| Ex. | $SiO_2/Al_2O_3$ | $H_2O/SiO_2$ | $OH^-/SiO_2$ | $Na^+/SiO_2$ | $K^+/SiO_2$ | $R/SiO_2$ | Time, Days | Product |
| 21 | 60 | 40 | 0.20 | 0.29 | — | 0.10 | 3 | 100% ZSM-51 |
| 22 | 60 | 40 | 0.20 | — | 0.29 | 0.10 | 4 | 100% ZSM-51 |

R = Trimethylene bis trimethylammonium iodide

From the above results, it can be seen that successful crystallization of ZSM-51 was obtained utilizing trimethylene bis trimethylammonium iodide.

EXAMPLES 23–24

The procedure of Examples 21 and 22 was repeated with the exception that tetramethylpiperazinium iodide was employed as a template in the reaction mixture. Again, the reaction mixture comprised water, silica sol, $Al_2(SO_4)_3 \cdot 16H_2O$, the tetramethylpiperazinium iodide, and sodium hydroxide. A molar ratio of reactants, as well as the results obtained are shown in the following Table 8.

TABLE 8
Crystallizations with Tetramethylpiperazinium

| | Mixture Mole Ratio | | | | | | |
|---|---|---|---|---|---|---|---|
| Ex. | $SiO_2/Al_2O_3$ | $H_2O/SiO_2$ | $OH^-/SiO_2$ | $Na^+/SiO_2$ | $R/SiO_2$ | Time, Days | Product |
| 23 | 180 | 40 | 0.20 | 0.24 | 0.05 | 3 | 50% Cryst. ZSM-51 |
| 24 | 90 | 40 | 0.20 | 0.29 | 0.05 | 3 | 100% ZSM-51 |

From the above table, it can be seen that tetramethylpiperazinium iodide was successful in producing zeolite ZSM-51.

Some of the samples of ZSM-51 produced from the procedure of Examples 1-24 were submitted for analysis, and the following Table 9 represents analytical data obtained.

TABLE 9

Analytical Data for ZSM-51 Samples

| Example | Template | N$_2$O: | Na$_2$O: | K$_2$O: | SiO$_2$: | Co | C N |
|---|---|---|---|---|---|---|---|
| 4 | A | — | 3.3 | — | 147 | 5.6 | — |
| 5 | A | — | 3.1 | — | 79 | 3.2 | — |
| 8 | A | — | 1.7 | — | 55 | 2.3 | — |
| 10 | A | — | — | 2.2 | 58 | 2.2 | — |
| 9 | A | — | 2.5 | — | 53 | 2.1 | — |
| 11 | A | — | 2.1 | — | 27 | 1.2 | — |
| 16 | B | 26.6 | 3.3 | — | 1470 | — | 9.5 |
| 18 | B | 1.2 | — | 0.56 | 51 | — | 8.3 |
| 19 | B | 1.2 | — | 0.82 | 51 | — | 8.2 |
| 20 | B | 1.6 | 0.57 | — | 50 | — | 6.2 |
| 21 | C | 1.6 | 1.1 | — | 58 | — | 4.7 |
| 22 | C | 1.5 | — | 0.26 | 58 | — | 4.9 |

TABLE 9-continued

Analytical Data for ZSM-51 Samples

| Example | Template | N$_2$O: | Na$_2$O: | K$_2$O: | SiO$_2$: | Co | C N |
|---|---|---|---|---|---|---|---|
| 24 | D | 2.4 | 0.82 | — | 75 | — | 3.6 |

A = Cobalticinium cation
B = Dimethylpiperidinium Iodide
C = Diquat-3
D = Tetramethylpiperazinium Iodide

EXAMPLE 25

The ZSM-51 produced by the procedure of Example 5 was evaluated for its ability to catalyze the combustion of carbon monoxide.

A ratio of air to carbon monoxide of 0.22 was employed, passed over the catalyst of Example 5 at a vapor hourly space velocity of 45,000 (on catalyst). At 600° C. the catalyst combusted about 87% of the carbon monoxide and at a temperature of 650° C. essentially 100% CO combustion was obtained.

What is claimed is:

1. A crystalline zeolite material having a composition in its dehydrated form expressed as mole ratios of oxides as follows:

$$(X)R_2O.(Y)M_2O.0-7Al_2O_3.100SiO_2$$

wherein X is a number ranging from 0.01 to 5, Y is a number ranging from 0.1 to 10, M is an alkali metal cation and R is selected from the group consisting of cobalticinium, dimethylpiperidinium, trimethylene bis trimethylammonium, and tetramethylpiperazinium; said crystalline material having the significant x-ray lines set forth in Table 1 of the specification.

* * * * *

UNITED STATES PATENT AND TRADEMARK OFFICE
CERTIFICATE OF CORRECTION

PATENT NO. : 4,568,654

DATED : February 4, 1986

INVENTOR(S) : Ernest W. Valyocsik

It is certified that error appears in the above-identified patent and that said Letters Patent is hereby corrected as shown below:

Column 1, line 21, change "crystlline" to --crystalline--.

Column 1, line 45, change "na" to --Na--.

Column 2, line 28, change "hs" to --has--.

Column 12, line 68, insert --R = tetramethylpiperazinium iodide--

Signed and Sealed this

Twenty-seventh Day of May 1986

[SEAL]

Attest:

DONALD J. QUIGG

Attesting Officer

Commissioner of Patents and Trademarks